United States Patent [19]
De Filippo

[11] Patent Number: 5,713,627
[45] Date of Patent: Feb. 3, 1998

[54] MOTOR-VEHICLE SEAT

[75] Inventor: Emilio De Filippo, Bruzolo, Italy

[73] Assignee: Gestind-M.B. Manifattura di Bruzolo S.p.A., Bruzolo, Italy

[21] Appl. No.: 763,258

[22] Filed: Dec. 10, 1996

[30] Foreign Application Priority Data

Jul. 16, 1996 [IT] Italy ................. TO960148 U

[51] Int. Cl.⁶ ........................................ A47C 7/62
[52] U.S. Cl. ...................... 297/188.04; 297/463.2; 297/463.1; 135/16; 248/534; 220/601
[58] Field of Search ............. 297/188.04, 188.16, 297/188.01, 188.14, 463.1, 463.2; 135/15.1, 16; 220/601; 248/534, 535; 211/62

[56] References Cited

U.S. PATENT DOCUMENTS

| | | |
|---|---|---|
| 3,468,450 | 9/1969 | Webel ................... 220/601 |
| 4,789,200 | 12/1988 | Munguia ................. 297/184.16 |
| 4,871,141 | 10/1989 | Chen ..................... 297/184.16 |
| 5,161,560 | 11/1992 | Sheu ..................... 135/15.1 |
| 5,320,406 | 6/1994 | North .................... 297/188.14 |
| 5,356,107 | 10/1994 | Sinohuiz ................. 297/188.01 |

*Primary Examiner*—Peter M. Cuomo
*Assistant Examiner*—Anthony D. Barfield
*Attorney, Agent, or Firm*—Sughrue, Mion, Zinn, Macpeak & Seas, PLLC

[57] ABSTRACT

A motor-vehicle seat comprising a vertically elongated and upwardly open lateral hollow body, arranged substantially at one side of the backrest rearwardly of the seat cushion and providing a stand receptacle for umbrellas or similar articles.

2 Claims, 1 Drawing Sheet

MOTOR-VEHICLE SEAT

BACKGROUND OF THE INVENTION

The present invention is generally related to motor-vehicle seats comprising a cushion and a backrest.

SUMMARY OF THE INVENTION

The seat according to the invention is essentially characterized in that it further comprises a vertically elongated and upwardly open lateral hollow body, arranged substantially at one side of the backrest rearward of the seat cushion and providing a stand receptacle for umbrellas or similar articles.

Utility of the invention consists of that a convenient housing is made available to the user into which an umbrella, a walking-stick or similar elongated objects can conveniently be fitted and subsequently equally conveniently removed for use. In the case of a wet umbrella, the receptacle of the seat according to the invention further advantageously provides a rain water collecting container, and to such effect the receptacle may conveniently be provided at the bottom thereof with a releasable discharge plug.

In the case the seat cushion is provided of a substantially rigid moulded plastic material flank, said hollow body may be conveniently formed in one moulded piece with said rigid flank. Alternatively, the hollow body may be constituted by a separate member secured to the seat structure by any convenient means.

BRIEF DESCRIPTION OF THE DRAWINGS

The invention will now be disclosed in detail with reference to the accompanying drawings, purely provided by way of non-limiting example, in which.

DETAILED DESCRIPTION OF THE INVENTION

Figure 1:
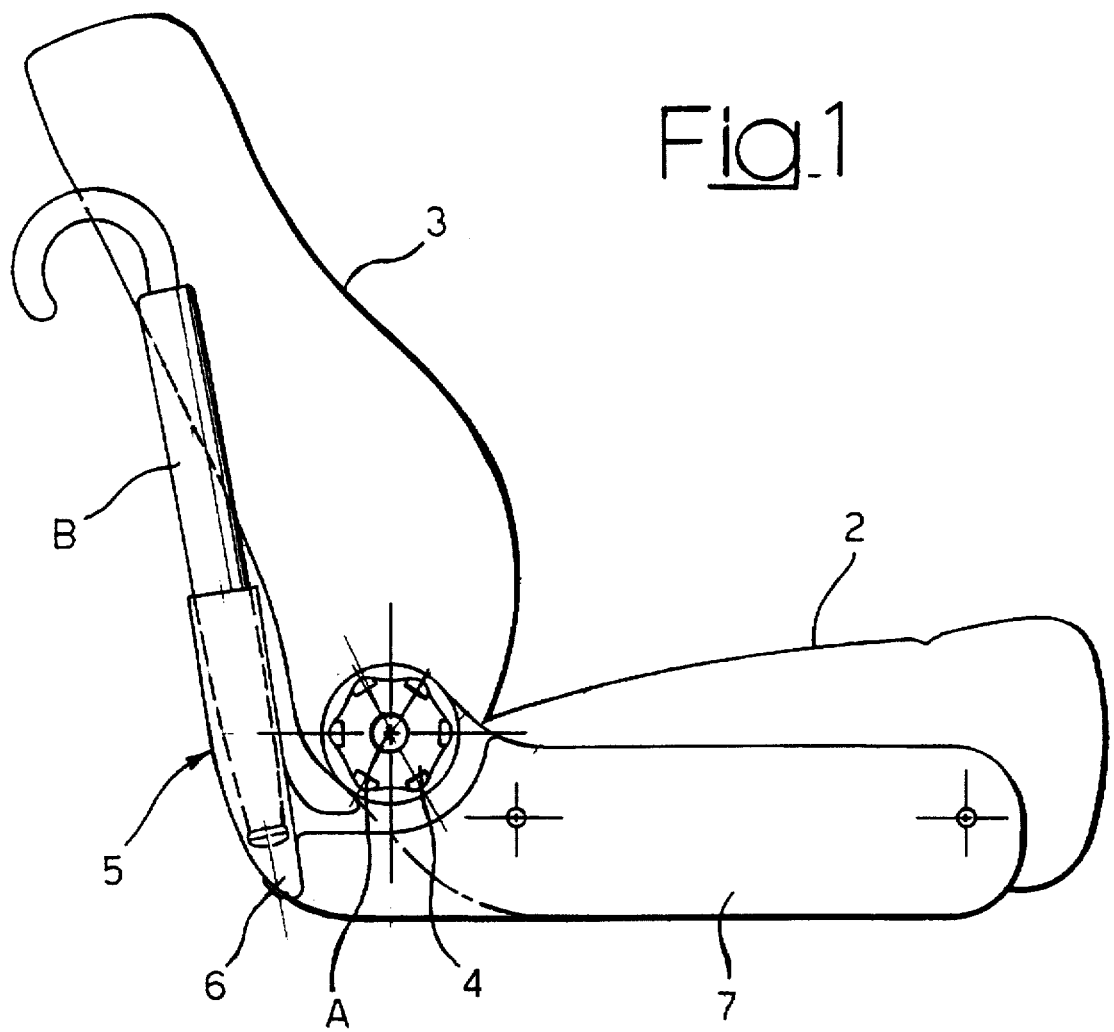
FIG. 1 is a diagrammatic lateral elevational view of a motor-vehicle seat according to the invention.
Figure 2:
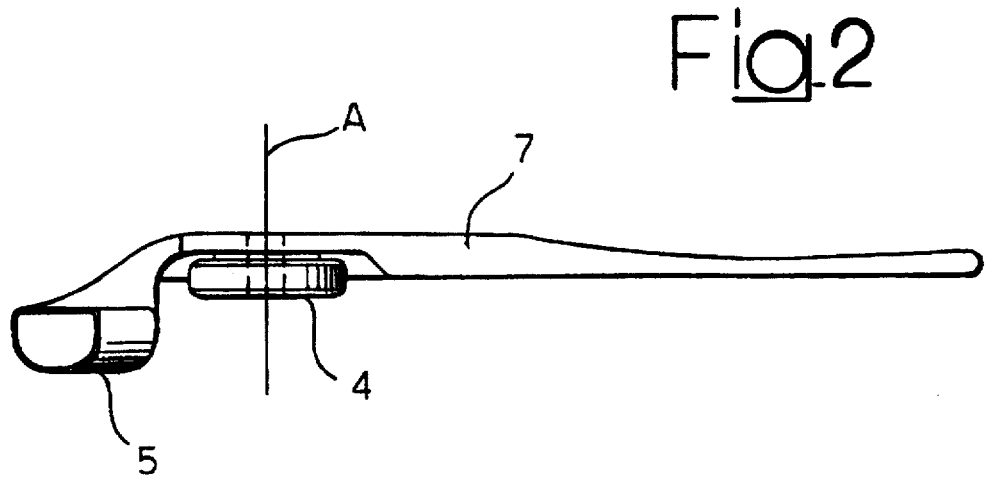
FIG. 2 is a top plan simplified view of FIG. 1.

The present description and the following claims are intended to be referred to the mounted condition of the seat according to the invention on board of a motor-vehicle.

In the drawings, reference numeral 1 generally designates a motor-vehicle seat, formed by a seating portion or cushion 2 and by a backrest 3, normally connected to the rear end of the cushion 2 in a tiltable fashion around a horizontal transverse axis A. This pivoted connection enables, in a way known per se, slant adjustment of the backrest 3, for instance by means of a control knob 4 or any equivalent system.

According to the invention, the seat 1 is provided with a lateral hollow body 5, having a vertically elongated design and upwardly open, which is arranged substantially at one side of the backrest 3, rearward of the cushion 2 and in correspondence of the outer side of the seat 1, i.e. the side facing towards a vehicle lateral door. The hollow B, or similar elongated articles, such as walking-stick and the like.

In correspondence of its bottom end, the hollow body 5 may be provided with a releasable plug 6 for discharging any water collected therein.

The hollow body 5 is normally made of moulded plastic material, and may be formed by a separate member secured to the structure of the seat 1 by any suitable means. Alternatively, and according to the shown example, the hollow body 5 may moulded integrally with a flank or case 7, made of moulded plastic material, provided in a conventional way on the side of the cushion 2.

Naturally the details of construction and the embodiments may be widely varied with respect to what has been disclosed and illustrated, without thereby departing from the scope of the present invention, such as defined in the appended claims.

What is claimed is:

1. A motor-vehicle seat comprising a seating portion, a backrest portion connected to said seating portion, at least one side flank mounted on said seat and disposed along one side of said seating portion and a vertically elongated upwardly open hollow body mounted on said seat adjacent one side of said backrest, wherein said hollow body and said side flank are formed as a rigid one-piece molded plastic member.

2. A motor-vehicle seat as set forth in claim 1, wherein said hollow body is provided with a releasable discharge plug adjacent a body end of the hollow body.

\* \* \* \* \*